United States Patent Office 3,398,183
Patented Aug. 20, 1968

3,398,183
PRODUCTION OF AMINOALKANOL
SULFURIC ACIDS
Hubert Kindler, Uwe Soenksen, and Arnold Wittwer, Ludwigshafen (Rhine), Germany, assignors to Badische Anilin- & Soda-Fabrik Aktiengesellschaft, Ludwigshafen (Rhine), Germany
No Drawing. Filed Aug. 19, 1965, Ser. No. 481,114
Claims priority, application Germany, Sept. 5, 1964,
B 78,417
4 Claims. (Cl. 260—458)

ABSTRACT OF THE DISCLOSURE

Process for the production of aminoalkanol sulfuric acids by simultaneously introducing an aminoalkanol and sulfuric acid into a vigorously stirred inert suspension agent which is not miscible with water and is kept boiling at a temperature in the range of from 70° to 150° C. and distilling off the water formed in the reaction together with part of the suspension agent. Aminoalkanol sulfates have many uses. They are e.g. intermediates in the preparation of the corresponding ethylenimine derivatives.

---

The invention relates to a process for the production of aminoalkanol sulfuric acids, i.e. sulfuric acid esters of aminoalkanols.

Methods for the production of 2-aminoethanol sulfuric acid (2-aminoethylsulfuric acid) are already known. Thus a mixture of monoethanolamine and sulfuric acid in the molar ratio 1:1, in the presence or absence of water, has been heated to about 250° C. and the water of reaction has been distilled off together with any water contained in the original mixture. Complete removal of water is not possible, so that conversion remains incomplete. When the reaction mixture is cooled, it solidifies to a material which is difficult to handle. Moreover decomposition, which begins at the high temperature, causes a decrease in the yield and contamination of the product.

In another prior art method the dehydration of the reaction mixture is carried out at subatmospheric pressure at about 150° C. Although decomposition of the aminoalkanol sulfuric acid formed is substantially avoided in this method, only incomplete conversion is obtained and a mixture which solidifies when cooled. A stirrable mash may be obtained by adding absolute alcohol during cooling and the crystallized ester may be separated therefrom. To avoid losses of alcohol and monoethanolamine it is necessary however to subject the mother liquor to expensive processing.

Some of these difficulties are obviated in a prior art method by carrying out the esterification in a boiling dispersing agent which is not miscible or is incompletely miscible with water. The reaction media used include toluene, o-dichlorobenzene and higher aliphatic alcohols.

In all the prior art methods, neutralization of monoethanolamine and sulfuric acid is first carried out at low temperature while removing the heat of neutralization and large cooling surfaces and very long reaction periods are required. In solvents, such as toluene and o-dichlorobenzene, in which the syrupy sulfuric acid salt of monoethanolamine first formed is not soluble, it is very difficult to convert the product, which becomes increasingly viscous as the reaction proceeds, into the crystalline condition without incrustation. Although the sulfate of ethanolamine is soluble in alcohols having four to ten carbon atoms and the ester crystallizes out in a well suspended form during the course of the reaction, secondary reactions occur between sulfuric acid and alcohol, for example ether formation, which can only be suppressed by maintaining a relatively low temperature. This makes long reaction periods necessary.

It is an object of the present invention to provide an economic process for the production of aminoalkanol sulfuric acids. It is another object of the invention to provide a process for the production of aminoalkanol sulfuric acids which can be carried out easily without difficulty in handling the materials. A further object of the invention is to provide a process for the production of ethanolamine sulfuric acids with high space time yields. These and other objects and advantages will be better understood from the following detailed description.

We have found that the said difficulties in the production of aminoalkanol sulfuric acids in suspension agents which are not miscible with water, from aminoalkanols and sulfuric acid at elevated temperatures can be avoided by allowing the aminoalkanol and the sulfuric acid to flow simultaneously with vigorous stirring into the suspension agent which is kept boiling in the range of from 70° to 150° C., the water formed in the reaction and any water introduced with the starting materials being distilled off with a portion of the suspension agent and the suspension agent being if desired returned after the water has been separated therefrom.

Suitable alkanolamines are those having the general formula

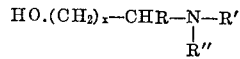

in which R denotes a hydrogen atom or an alkyl group, particularly the methyl group, R' denotes a hydrogen atom, cyclohexyl, cyclooctyl, or an alkyl group having one to four carbon atoms, R" denotes a hydrogen atom, cyclohexyl, cyclooctyl, or an alkyl group having one to four carbon atoms, R' and R" may together denote an alkylene group having four to seven carbon atoms and $x$ denotes an integer from 1 to 3. Examples of alkanolamines which may be used are isopropanolamine, N-isopropylethanolamine, N-cyclooctylethanolamine, N-cyclooctylisopropanolamine, N - cyclohexylethanolamine, 3-aminopropanol and particularly ethanolamine.

It is preferred to use sulfuric acid of 90 to 99% strength, for example in the form of commercial sulfuric acid, but pure sulfuric acid, which may contain excess sulfur trioxide, may be used.

The suspension agent which is not miscible with water is advantageously a liquid stable to sulfuric acid, particularly a saturated hydrocarbon or a mixture of the same which boils under the pressure used in the reaction at from 70° to 150° C., particularly from 100° to 130° C. At lower boiling temperatures, the esterification rate is very slow and moreover it is then necessary to distil off very large amounts of entrainer in order to remove the water formed in the reaction. At temperatures above 150° C. decomposition of the sulfuric acid ester formed begins so that the quality and yield are affected. Commercial mixtures of paraffin hydrocarbons which begin to boil at from 100° to 130° C. at atmospheric pressure, for example those having a high content of octanes, are particularly suitable suspension agents. Examples of other suitable suspension agents are isocyclic hydrocarbons, especially those with six to eight carbon atoms, for example cyclohexane, methylcyclohexane, cyclooctane, and halogen-substituted hydrocarbons, for example carbon tetrachloride, perchloroethylene or mixtures of such solvents. The reaction is carried out at atmospheric pressure or under subatmospheric pressure of for example 300 mm. Hg.

In order to carry out the reaction for example the aminoalkanol and the sulfuric acid, preferably in about equimolar amounts, are allowed to flow slowly into the boiling suspension agent with vigorous mixing. It is possible however to use an excess of for example up to 10% or more of one or other of the reactants. It is advantageous to keep the ratio of aminoalkanol to sulfuric acid unchanged during the reaction, but a certain proportion of one component may be added first. For example a portion of the aminoalkanol may be added first and then the remainder of the aminoalkanol may be added with the sulfuric acid. The reaction mixture thus remains weakly alkaline so that corrosion is avoided. The components are advantageously added so slowly that the syrupy salt first formed is further reacted to the crystalline ester before large amounts accumulate in the suspension and form large agglomerates. For example 0.1 to 15 moles, preferably 1 to 5 moles, of aminoalkanol and an equivalent amount of sulfuric acid may be added per hour per liter of suspension agent.

In batchwise production it is advantageous for the starting materials to be added particularly slowly at the beginning. As soon as some crystallized ester has been formed, the rate of supply can be increased. If a certain amount, for example 10 to 200 g./l. of already crystallized aminoalkanol sulfuric acid ester be added to the suspension agent, the rate of feed of the aminoalkanol and of the sulfuric acid may be high from the start.

The water formed is distilled off simultaneously with the reaction medium which is boiling under reflux. It may be separated from the condensate and the suspension agent may be recycled. It is advantageous to distill off the water relatively quickly because the reaction product tends to agglutinate and form a crust if large amounts of water accumulate in the reaction mixture. After all the reactants have been added, distillation is continued until no appreciable further amounts of water pass over with the suspension agent. The reaction is then complete to the extent of 98 to 100%. Very pure aminoalkanol sulfuric acid ester, of purity more than 98%, may be separated by filtration. Alternatively the crystal mash may be introduced direct into aqueous alkali metal hydroxide or alkaline earth metal hydroxide solution so that the suspension agent separates as the lighter phase. The aqueous solution of the salts of the aminoalkanol sulfuric acids thus formed may be used direct for example for conversion into alkyleneimines, e.g. ethylenimines. Dissolved or emulsified hydrocarbons which remain in the solution may be decreased to less than 1 p.p.m. by stripping with air or by distillation for a short time at subatmospheric pressure at 20° to 70° C. No appreciable formation of imine takes place during this treatment.

The new process offers a number of advantages over the prior art methods: neutralization of the aminoalkanol and the esterification take place simultaneously and are carried out using the heat of reaction for the separation of the water by distillation. The reaction, especially on a commercial scale, may therefore be carried out very much more quickly with a saving in cooling and heating energy.

When a rate of supply is maintained which ensures a high degree of conversion in the reaction mixture at any time, a well crystallized, stirrable reaction material is present in the mash at all times and no agglutination or incrustation takes place. The new process is particularly suitable for continuous operation and the reaction is advantageously carried out in a cascade of stirred vessels to achieve the highest possible conversion.

The invention is further illustrated by the following examples.

Example 1

250 ml. of octane is boiled vigorously with 0.1 mole of β-aminoethanol sulfuric acid ester in a round flask having a capacity of 500 ml. which is fitted with a reflux condenser having a water separator for the distillate and an efficient stirrer. 1 mole each of concentrated sulfuric acid and monoethanolamine is uniformly added during the course of about ninety minutes to the well stirred mash. Water formed in the reaction is continuously distilled off with the suspension agent. The water is separated from the distillate and the octane is recycled into the reactor. When the whole of the reactants has been added distillation is continued for about half an hour until the calculated amount of water has collected in the separator. A mash which is capable of being stirred well is obtained from which the crystallized ester may be separated easily. The yield is between 98 and 100% of a very pure, more than 98% β-aminoethanol sulfuric acid ester.

Example 2

12 moles of β-aminoethanol sulfuric acid ester and 2,000 ml. of octane are stirred in a 3 liter stirred vessel having overflow pipes and a reflux condenser while being boiled vigorously. 4 moles of concentrated sulfuric acid, 4 moles of monoethanolamine and 660 ml. of octane are supplied uniformly per hour. The water formed is continuously separated from the distillate and the octane is recycled. The mash of ester and outane is withdrawn continuously. Esterification is complete to the extent of about 90% in the effluent mixture. The conversion becomes practically quantitative by further reaction in a second similar stirred vessel arranged in cascade with the first.

Example 3

A suspension of 1 mole of 3-aminopropanol-1-sulfuric acid ester and 500 g. of octane is refluxed through a water separator with intense stirring. During the course of five hours, 5 moles of 3-aminopropanol-1 and 5 moles of concentrated sulfuric acid are allowed to flow into the said suspension slowly and simultaneously. The water liberated by the reaction is separated through the water separator and the octane is recycled to the reaction flask. After all the amine and sulfuric acid has been added, boiling under reflux through the water separator is continued for another one to two hours until the calculated amount of water has been separated. The crystallized ester is then separated and dried. The yield is about 98 to 100% of 3-aminopropanol-1-sulfuric acid ester of about 98 to 99% purity.

We claim:

1. A process for the production of aminoalkanol sulfuric acids of the formula

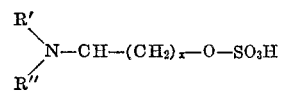

in which R denotes a member of the group consisting of a hydrogen atom and a methyl group, R' and R" each denotes a member of the group consisting of hydrogen, cyclohexyl, cyclooctyl and an alkyl group having from 1 to 4 carbon atoms and $x$ denotes an integer of from 1 to 3, which comprises introducing simultaneously an amino alkanol of the formula

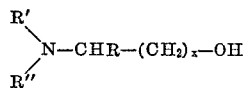

in which R, R', R" and $x$ have the meanings given above and sulfuric acid into a vigorously stirred inert suspension agent which is not miscible with water and which is kept boiling at a temperature in the range of from 70° to 150° C., said suspension agent being a saturated hydrocarbon having a boiling point in the range of from 70° to 150° C., and distilling off the water formed in the reaction together with part of the suspension agent.

2. A process as claimed in claim 1 wherein the suspension agent which has been distilled off is separated from the entrained water and is recycled.

3. A process as claimed in claim 1 in which an inert suspension agent is used which has a boiling point in the range of from 100° to 130° C.

4. A processes for the production of aminoalkanol sulfuric acids of the formula

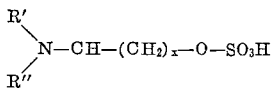

in which R denotes a member of the group consisting of a hydrogen atom and a methyl group, R' and R'' each denotes a member of the group consisting of hydrogen, cyclohexyl, cyclooctyl and an alkyl group having from 1 to 4 carbon atoms and $x$ denotes an integer of from 1 to 3, which comprises introducing simultaneously an aminoalkanol of the formula

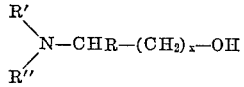

in which R, R', R'' and $x$ have the meanings given above and sulfuric acid into a vigorously stirred inert suspension agent which is not miscible with water and which is kept boiling at a temperature in the range of from 70° to 150° C. and which from the start contain from 10 to 200 g. of crystallized alkanolaminosulfuric acid ester per liter of suspension agent, said suspension agent being a saturated hydrocarbon having a boiling point in the range of from 70° to 150° C.

References Cited

UNITED STATES PATENTS

| | | | |
|---|---|---|---|
| 1,964,654 | 6/1934 | Ulrich et al. | 260—98 |
| 2,063,963 | 12/1936 | Ulrich et al. | 260—98 |
| 2,081,865 | 5/1937 | Elbel | 260—99.12 |
| 2,264,759 | 12/1941 | Jones | 260—458 |
| 3,133,950 | 5/1964 | Pizzarello et al. | 260—458 |

FOREIGN PATENTS

| | | |
|---|---|---|
| 581,539 | 10/1964 | Great Britain. |

CHARLES B. PARKER, *Primary Examiner.*

L. C. MARUZO, *Assistant Examiner.*

UNITED STATES PATENT OFFICE
CERTIFICATE OF CORRECTION

Patent No. 3,398,183                        August 20, 1968

Hubert Kindler et al.

It is certified that error appears in the above identified patent and that said Letters Patent are hereby corrected as shown below:

Column 4, line 20, "outane" should read -- octane --; lines 45 to 49, the formula should appear as shown below:

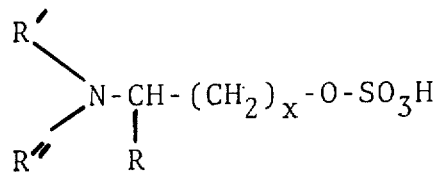

Column 5, line 1, "processes" should read -- process --.

Signed and sealed this 21st day of April 1970.

(SEAL)
Attest:

EDWARD M. FLETCHER, JR.              WILLIAM E. SCHUYLER, JR.
Attesting Officer                    Commissioner of Patents